United States Patent [19]

Miyazaki et al.

[11] Patent Number: 4,603,891
[45] Date of Patent: Aug. 5, 1986

[54] HOSE MIDWAY HOLDER

[75] Inventors: Takeshi Miyazaki, Inazawa; Kenji Sugiyama, Gifu, both of Japan

[73] Assignee: Toyoda Gosei Co., Ltd., Nishikasugai, Japan

[21] Appl. No.: 645,153

[22] Filed: Aug. 28, 1984

[30] Foreign Application Priority Data

Aug. 29, 1983 [JP] Japan ............................ 58-133321[U]

[51] Int. Cl.⁴ .............................................. F16L 5/00
[52] U.S. Cl. ..................................... 285/205; 285/297
[58] Field of Search ............... 285/205, 206, 207, 208, 285/297, 294, 16

[56] References Cited

U.S. PATENT DOCUMENTS

| | | | |
|---|---|---|---|
| 1,875,209 | 8/1932 | Baldwin, Jr. | 285/205 X |
| 2,462,348 | 2/1949 | Batchler | 285/297 |
| 2,813,692 | 11/1957 | Bremer et al. | 285/294 X |
| 2,920,910 | 1/1960 | Schnabel | 285/294 X |
| 3,031,212 | 4/1962 | Oliver | 285/297 X |
| 3,224,796 | 12/1965 | Burkitt | 285/297 X |
| 3,847,694 | 11/1974 | Stewing | 285/297 X |
| 4,226,444 | 10/1980 | Bunyan | 285/294 X |

FOREIGN PATENT DOCUMENTS

| | | | |
|---|---|---|---|
| 746426 | 4/1970 | Belgium | 285/294 |
| 650313 | 10/1962 | Canada | 285/297 |
| 716467 | 8/1965 | Canada | 285/297 |
| 6409089 | 2/1966 | Netherlands | 285/297 |
| 131277 | 4/1929 | Switzerland | 285/294 |

*Primary Examiner*—Thomas F. Callaghan
*Attorney, Agent, or Firm*—Cushman, Darby & Cushman

[57] ABSTRACT

Herein disclosed is a hose midway holder which is formed into such a cylindrical shape as to be fixedly mounted on a hose. The hose midway holder comprises a flanged portion formed on the outer circumference thereof for being brought into abutment against the peripheral edge of a mounting hole of a mounting fixture, and a groove portion formed in the outer circumference thereof for receiving a fixing clip which is adapted to clamp the peripheral edge of the mounting hole of the mounting fixture together with the flanged portion. The hose midway holder is formed in the inner circumference thereof with a recessed portion and a communication port for providing communication between the former and the outside of the outer circumference of the hose midway holder.

6 Claims, 9 Drawing Figures

HOSE MIDWAY HOLDER

BACKGROUND OF THE INVENTION

1. Field of the Invention

The present invention relates to a hose midway holder which is used when it is fixedly mounted on a hose to mount the hose on a mounting fixture.

2. Description of the Prior Art

A hose midway holder 1 of the above-specified kind according to the prior art is made cylindrical and formed on and in its outer circumference with a flanged portion 2 for abutment against with the peripheral edge of a mounting hole of a mounting fixture, a groove portion 3 for receiving a fixing clip, which is adapted to clamp the peripheral edge of the mounting hole of the mounting fixture together with the flanged portion 2, and a sleeved portion 4. In case the hose midway holder 1 is to be fixedly mounted on a hose 5, moreover, it is placed in position and is caulked at its sleeved portion 4.

As a result, the hose midway holder 1 of the prior art is fixed on the hose 5 by the caulking operation to plastically deform a portion of the sleeve portion 4 thereby locally pressing hose 5. This creates the possibility that the caulking operation will effect hose 5 so that its internal diameter is reduced more than a predetermined value.

SUMMARY OF THE INVENTION

It is, therefore, an object of the present invention to provide a hose midway holder which can be simply and easily fixed on a hose without performing any caulking operation that will reduce the internal diameter of the hose more than a predetermined value.

In the cylindrical hose midway holder to be fixedly mounted on a hose, which comprises a flanged portion formed on the outer circumference thereof for being brought into abutment against the peripheral edge of a mounting hole of a mounting fixture, and a grooved portion formed in the outer circumference thereof for receiving a fixing clip adapted to clamp the peripheral edge of the mounting hole of the mounting fixture together with the flanged portion, the above-specified object can be achieved forming a recessed portion in the inner circumference of the hose midway holder and a communication port for providing communication between the recessed portion and the outside of the outer circumference of the hose midway holder.

Moreover, this hose midway holder can be fixedly mounted on the hose by placing it in a predetermined position of the hose and by injecting from the communication port into the recessed portion either such an adhesive or a filler, e.g., rubber, urethane or a synthetic resin as can be fixed to the hose thereby to form a land, so that, in case the adhesive is used, the hose midway holder can be fixed on the hose by both the adhesiveness and such an injection pressure of the adhesive as is applied not partially to the outer circumference of the hose in the recessed portion of the hose midway holder or so that, in case the adhesive or the filler is used even if the injection pressure is low, the filler can form in the hose the land to perform a function to prevent the hose from coming out of its holder, whereby the hose midway holder can be simply and easily fixed on the hose merely by injecting the adhesive or the filler but without performing any caulking operation.

DESCRIPTION OF THE PREFERRED EMBODIMENTS

Figure 1:
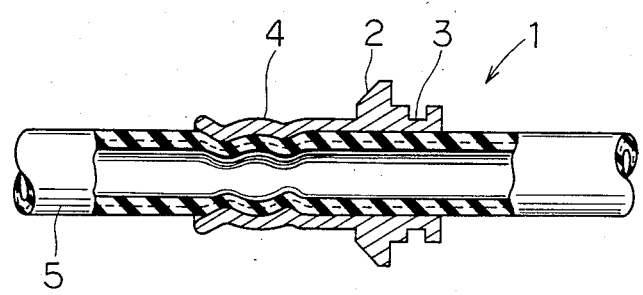
FIG. 1 is a sectional view showing the mode in which the hose midway holder of the prior art is used.

A hose midway holder 11 according to a first embodiment of the present invention is formed either by cutting a rod of metal such as steel, bronze or aluminum or by molding a nonmetallic material such as a synthetic resin or a synthetic resin reinforced by glass fibers or the like. The hose midway holder 11 is formed, like the prior art, into a cylindrical shape therefor has a flanged portion 12 and a grooved portion 13 on its outer circumference and has such an internal diameter as can be mounted on the hose 5. Moreover, the inner circumference of the hose midway holder 11 is formed over substantially all the length and the inner circumference of thereof with a recessed portion 14 which in turn is formed with such two communication ports 15 and 15 as can provide communication between itself and the outside of the outer circumference of the hose midway holder 11. Those two communication ports 15 need not be formed two in number because one of them acts as an injection port whereas the other acts as an air vent hole when an adhesive or the like is to be injected, as will be described hereinafter. Flanged portion 12 of the embodiment is formed at its outer circumferencial sides with flat faces 12a which will fit in the mounting hole of a mounting fixture, function being to stop any turning of the hose when the hose midway holder 11 is fixedly mounted on the hose and in the mounting hole of the mounting fixture.

Figure 2:
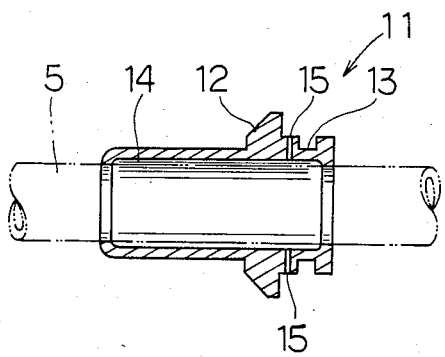
FIG. 2 is a sectional view showing a hose midway holder according to a first embodiment of the present invention.
Figure 3:
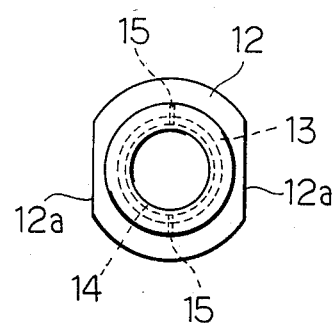
FIG. 3 is a side elevation showing the hose midway holder of the first embodiment.
Figure 4:
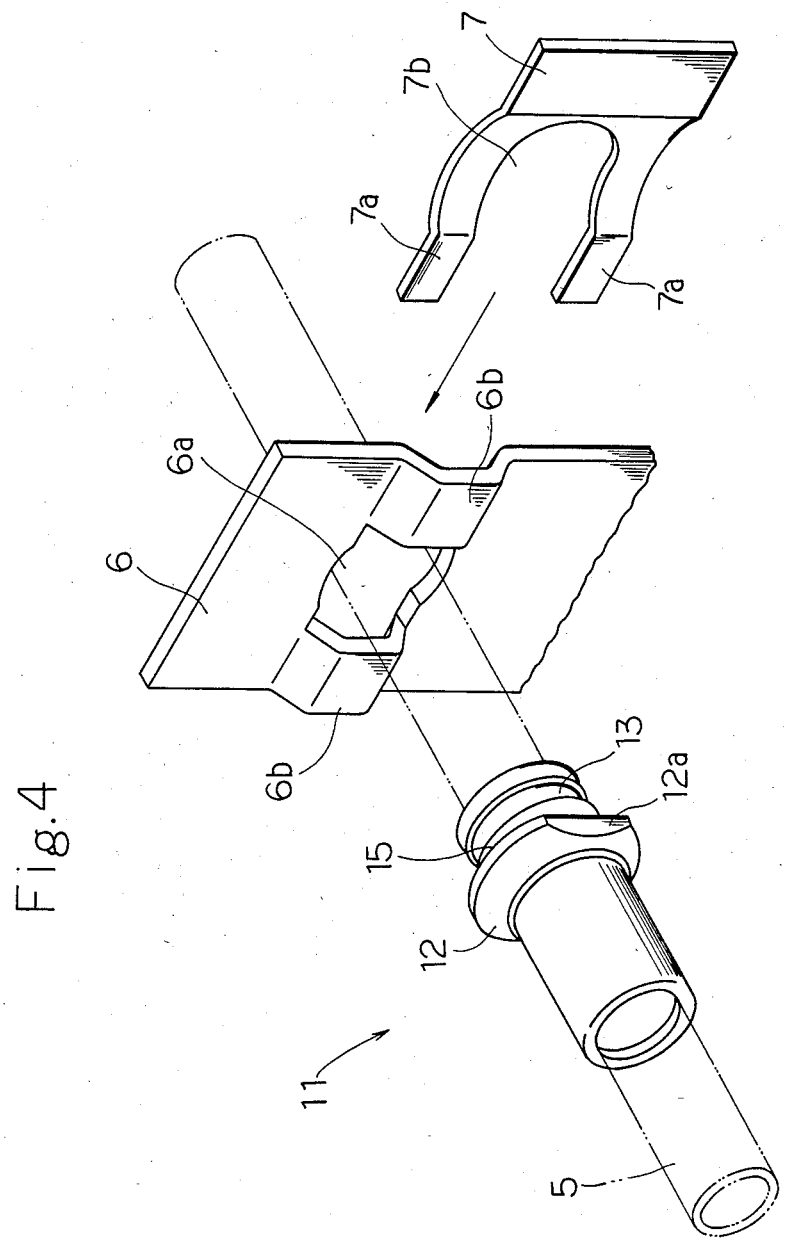
FIG. 4 is an exploded perspective view showing the mode in which the hose midway holder of the first embodiment is used.
Figure 5:
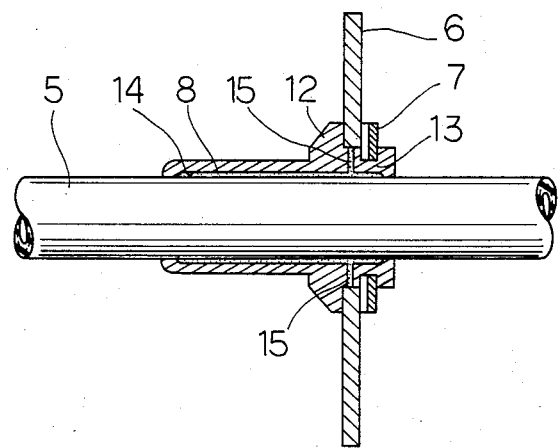
FIG. 5 is a sectional view showing the hose midway holder of the first embodiment.

The mode of using the hose midway holder 11 of the embodiment will be described in the following (with reference to FIGS. 2, 3, 4 and 5). First of all, the hose midway holder 11 is mounted in a predetermined position of the hose 5, and an adhesive 8 is injected into one of the communication ports 15. Then, the adhesive 8 fills up the recessed portion 14 to solidify so that its adhesiveness and injection pressure fix the hose midway holder 11 on the hose 5. Although the hose 5 is pressed by the injection pressure of the adhesive 8, the pressure is applied to all the surface of the outer circumference of the hose 5 in the recessed portion 14, and this is different from the caulking method of locally pressing the hose 5. Accordingly the hose midway holder 11 is sufficiently fixed on hose 5 without reducing the internal diameter of hose 5 more than a predetermined value.

Moreover, the hose 5 having the hose midway holder 11 fixed thereon is inserted into a mounting hole 6a of a mounting fixture 6. Mounting hole 6a of that mounting fixture 6 is sized to abut against the flanged portion 12 of the hose midway holder 11 and is formed on its peripheral edge with bulged portions 6b being shaped so that they can abut against the flat faces 12a of the flanged portion 12, respectively.

The hose 5 having the hose midway holder 11 fixed thereon is then inserted into the mounting hole 6a of the mounting fixture 6 to bring the flanged portion 12 into abutment against the peripheral edge of the mounting hole 6a and to bring the flat faces 12a of the flanged portion 12 into abutment the end faces of the bulged portions 6b. Then a fixing clip 7 is inserted into the grooved portion 13 thereby to mount the hose 5 in the mounting fixture 6. Fixing clip 7 is formed with a U-shaped groove 7b which is defined by two tongues 7a. These two tongues 7a are bulged, and their inter-space is sized to allow them to be fitted in the grooved portion 13 of the hose midway holder 11 so that the two tongues 7a can clamp the peripheral edge of the mounting hole 6a of the mounting fixture 6 together with the flanged portion 12, when they are fitted in the grooved portion 13, thereby to prevent hose 5 and the hose midway holder 11 from coming out of mounting fixture 6.

A hose midway holder 21 according to a second embodiment of the present invention is formed of a tubular material which is similar to that of the first embodiment and which has such an internal diameter as can be mounted on hose 5. After that tubular member has been cut to have a predetermined length, the hose midway holder 21 is plastically deformed by the bulging operation to form a flanged portion 22 and is further plastically deformed by the flaring operation to form a grooved portion 23. On the other hand, the flanged portion 22 is formed with flat faces 22a on its outer circumferential sides simultaneously with the bulging operation so that the flat faces 22a may be fitted in the mounting hole 6a of the mounting fixture 6 to stop rotation of hose 5. And, a space formed when that flanged portion 22 is formed provides a recessed portion 24. This recessed portion 24 is formed into such a drum shape as is narrowed at portions corresponding to the flat faces 22a, because it is provided when the flat faces 22a are formed simultaneously with the flanged portion 22. That recessed portion 24 is formed with two communication ports 25 which are similar to those of the first embodiment.

Figure 9:
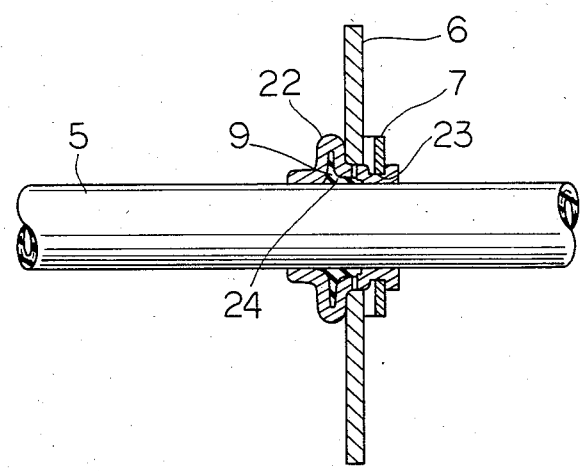
FIG. 9 is a sectional view showing the mode in which the hose midway holder of the second embodiment is used.
Figure 6:
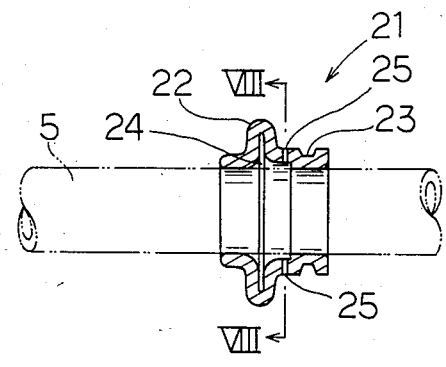
FIG. 6 is a sectional view showing a hose midway holder according to a second embodiment of the present invention.
Figure 7:
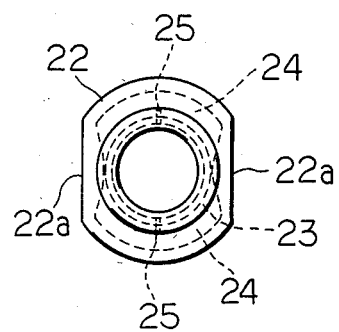
FIG. 7 is a side elevation showing the hose midway holder of the second embodiment.
Figure 8:
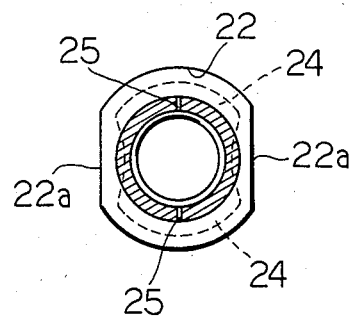
FIG. 8 is a section taken along line VIII—VIII of FIG. 6.

The mode of using the hose midway holder 21 of the second embodiment will be described in the following (with reference to FIGS. 6, 7, 8 and 9). First of all, the hose midway holder 21 is placed in a predetermined position of the hose 5, and such a filler 9, e.g., rubber or urethane as can secure to the hose 5 to form a land is injected from one of the communication ports 25. Then, the filler 9 fills up the recessed portion 24 and solidifies so that it secures as such a land to the hose as has a contour corresponding to the recessed portion 24. Even if that filler 9 is not adhered to the hose midway holder 21, the land corresponding to the drum shape of the recessed portion 24 on the hose 5 so that the hose 5 is prevented from turning and moving relative to the hose midway holder 21. After all, the hose midway holder 21 is fixedly mounted on the hose 5.

Moreover, the hose 5 having the hose midway holder 21 fixed thereon is mounted in the mounting fixture 6 like the first embodiment by the use of the fixing clip 7.

Since the hose midway holder 21 of the second embodiment is formed with the recessed portion 24 simultaneously as the flanged portion 22, the grooved portion 23 and so on are formed by elastically deforming the tubular material, it is excellent in its production yield, shorter in its working period and smaller in its working energy allowing a lower production cost than that which has its individual portions formed by cutting the rod material, and its strength can be improved because the flow of the material is not interrupted.

In the shown embodiments, the recessed portions 14 and 24 are formed over all the inner circumferences of the hose midway holders of the first and second embodiments, but it is quite natural that the recessed portions may be formed partially in the inner circumferences. In this case, even if the pressure of the adhesive to be injected is low, the adhesive or filler injected forms the hose with a land to prevent the same from turning and moving relative to the hose midway holder.

In the hose midway holders of the first and second embodiments, moreover, the flanged portions 12 and 22 are formed with the flat faces 12a and 22a to prevent any rotation of the hose 5. Despite of this fact, those flat faces may be dispensed with if the prevention of the turn of the hose is not taken into consideration. In this modification, therefore, in the hose midway holder 11 of the first embodiment, for example, the injection pressure of the adhesive 8 to be injected into the recessed portion 14 is dropped to form the land in the hose 5 not according to the concept of fixing the hose and the hose midway holder 11 so that the land may perform the holding function to prevent the hose 5 from coming out of the hose midway holder 11.

What is claimed is:

1. A mounting device for fitting about a hose, said device being comprised of a generally tubular member cut to a predetermined length, said tubular member being axially deformed to define a radially outwardly extending flanged portion and a radially extending interior chamber, the outer circumference of said flanged portion having at least one flat exterior face defined by a cordal plane extending therethrough, said interior chamber having at least one inwardly recessed interior wall portion, means defining a communication port between said chamber and the outside of said device and filler material injected through said port means into said interior chamber to fill said chamber and to bond to the hose, so that relative motion between said hose and said device is prevented by said filler material in cooperation with said hose and said at least one inwardly recessed interior wall portion.

2. A device as in claim 1, wherein the device is used to mount the hose to a mounting fixture provided with means defining a mounting hole wherein said flanged portion can abut against the peripheral edge of the mounting hole and wherein said device is provided with means defining a groove circumferentially extending about the exterior thereof, said groove being spaced axially from said flange for receiving a fixing clip adapted to clamp the mounting fixture and said device together.

3. A device as in claim 1, wherein said interior chamber includes an additional axially extending recessed portion.

4. A device according to claim 3, wherein said recessed portion extends over substantially all the length and the inner circumference of said device excepting the end portions of the same.

5. A device according to claim 3, wherein said recessed portion extends partially along the inner circumference of said device.

6. A device as in claim 1, wherein the device includes a pair of opposed flat exterior faces and a pair of inwardly recessed interior wall portions within said interior chamber.

* * * * *